United States Patent
Malladi et al.

(10) Patent No.: US 8,223,625 B2
(45) Date of Patent: Jul. 17, 2012

(54) ACQUISITION IN FREQUENCY DIVISION MULTIPLE ACCESS SYSTEMS

(75) Inventors: Durga Prasad Malladi, San Diego, CA (US); Byoung-Hoon Kim, San Diego, CA (US); Juan Montojo, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 987 days.

(21) Appl. No.: 11/842,827

(22) Filed: Aug. 21, 2007

(65) Prior Publication Data

US 2008/0089282 A1 Apr. 17, 2008

Related U.S. Application Data

(60) Provisional application No. 60/839,954, filed on Aug. 23, 2006.

(51) Int. Cl.
*H04J 3/06* (2006.01)
*H04J 11/00* (2006.01)

(52) U.S. Cl. .................. 370/208; 370/350; 370/503

(58) Field of Classification Search .................. None
See application file for complete search history.

(56) References Cited

U.S. PATENT DOCUMENTS

| | | | |
|---|---|---|---|
| 5,343,512 A | 8/1994 | Wang et al. | |
| 5,930,366 A | 7/1999 | Jamal et al. | |
| 5,956,368 A * | 9/1999 | Jamal et al. | 375/146 |
| 6,256,508 B1 * | 7/2001 | Nakagawa et al. | 370/312 |
| 6,822,999 B1 * | 11/2004 | Lee et al. | 375/145 |
| 6,850,507 B1 | 2/2005 | Ok | |
| 6,894,995 B2 | 5/2005 | Chitrapu et al. | |
| 7,110,782 B2 | 9/2006 | Yamaguchi | |
| 7,218,936 B2 | 5/2007 | Rinne et al. | |
| 7,336,600 B2 * | 2/2008 | Feng et al. | 370/208 |
| 7,450,543 B2 * | 11/2008 | Laroia et al. | 370/331 |
| 7,633,976 B2 * | 12/2009 | Shieh et al. | 370/513 |
| 2003/0202541 A1 * | 10/2003 | Lim et al. | 370/503 |
| 2004/0085946 A1 | 5/2004 | Morita et al. | |
| 2004/0246998 A1 * | 12/2004 | Ma et al. | 370/527 |
| 2006/0233271 A1 * | 10/2006 | Savas et al. | 375/260 |

(Continued)

FOREIGN PATENT DOCUMENTS

DE 10145759 4/2003
(Continued)

OTHER PUBLICATIONS

International Search Report, PCT/US07/076689—International Search Authority—European Patent Office—Jul. 2, 2008.

(Continued)

*Primary Examiner* — Min Jung
(74) *Attorney, Agent, or Firm* — Qualcomm Patent Group; Howard Seo; Paul Kuo

(57) ABSTRACT

Systems and methods allow cell acquisition in a wireless communication system in frequency division multiple access mode of operation. Code sequences transmitted over primary synchronization channel (P-SCH) enable detection of symbol boundary, cyclic prefix duration, and indication of broadcast channel bandwidth. Sequences transmitted over secondary synchronization channel (S-SCH) afford radio frame boundary detection, cell identification, and broadcast channel bandwidth indication. Cell identification can be conveyed jointly between P-SCH and S-SCH codes. Broadcast channel sequences convey cyclic prefix timing, system bandwidth and other system information. Relay of cell acquisition information, as well as multiple-cell acquisition when wireless system operates with frequency reuse are described.

48 Claims, 14 Drawing Sheets

U.S. PATENT DOCUMENTS

| | | | |
|---|---|---|---|
| 2006/0268808 A1* | 11/2006 | Kang | 370/342 |
| 2007/0140106 A1 | 6/2007 | Tsai et al. | |
| 2007/0142058 A1 | 6/2007 | Matsumura et al. | |
| 2007/0183391 A1* | 8/2007 | Akita et al. | 370/350 |
| 2007/0248068 A1* | 10/2007 | Onggosanusi et al. | 370/338 |
| 2007/0291730 A1* | 12/2007 | Monfet et al. | 370/350 |
| 2010/0098031 A1* | 4/2010 | Charbit | 370/336 |

FOREIGN PATENT DOCUMENTS

| | | |
|---|---|---|
| EP | 1710930 | 10/2006 |
| EP | 1811712 | 7/2007 |
| JP | 2003179522 A | 6/2003 |
| JP | 2005295512 A | 10/2005 |
| RU | 2139631 C1 | 10/1999 |
| WO | WO2005088867 | 9/2005 |
| WO | 2006006052 | 1/2006 |
| WO | 2006064804 | 6/2006 |
| WO | WO2006062308 | 6/2006 |
| WO | 2007053954 | 5/2007 |
| WO | 2007075463 | 7/2007 |
| WO | 2007083912 | 7/2007 |

OTHER PUBLICATIONS

Ericsson et al. "Text Proposal on Cell Search in Evolved UTRA" 3GPP TSG-RAN WG1 #43, [Online] No. R1-051308. Nov. 7, 2005-Nov. 11, 2005, pp. 1-4, XP 002483763 Seoul, Korea.

NTT Docomo: "Physical Channel Concept for Scalable Bandwidth in Evolved UTRA Downlink," 3GPP TSG-RAN WG1 Ad Hoc on LTE, [Online] No. R1-050592, Jun. 20, 2005-Jun. 21, 2005 pp. 1-14, XP002483762, Sophia Antipolis, France.

Sharma, D et al., "Fast Cell Synchronization for Beyond 3G OFDMA Based System," International Conference on Wireless and Optical Communications Networks, Apr. 11, 2006, pp. 1-5, XP010933856.

Tanno, M. et al.: "Three-step fast cell search algorithm utilizing common pilot channel for OFCDM broadband packet wireless access", IEEE Vehicular Technology Conference Proceedings, vol. 3, Sep. 24, 2002, pp. 1575-1579, XP010608694 New York, NY: IEEE.

Written Opinion, PCT/US2007/076689—International Search Authority—European Patent Office—Jul. 2, 2008.

Taiwan Search Report—TW096131317—TIPO—Feb. 14, 2011.

Wen Tong "Common SYNC Symbol for OFDMA ", IEEE 802.16 Broadband Wireless Access Working Group <http://iee802.0r2/16> Aug. 31, 2004.

European Search Report—EP11171096—Search Authority—The Hague—Oct. 6, 2011.

NTT DoCoMo et al., Text proposal on cell search, 3GPP TSG RAN WG1 Meeting #44bis, R1-061084, 3GPP, Mar. 31, 2006, p. 1-7.

NTT DoCoMo, Fujitsu, NEC, Toshiba Corporation,SCH Structure and Cell Search Method in E-UTRA Downlink,3GPP TSG-RAN WG1 LTE Ad Hoc, R1-061662,3GPP, Jun. 30, 2006, p. 1-11.

Partial European Search Report—EP11171096, Search Authority—The Hague Patent Office, Jul. 11, 2011.

ZTE, TP for Downlink Synchronization Channel Schemes for E-UTRA, 3GPP TSG-RAN1 WG1 #42bis, R1-051072, 3GPP, Oct. 14, 2005.

* cited by examiner

ACQUISITION IN FREQUENCY DIVISION MULTIPLE ACCESS SYSTEMS

CROSS-REFERENCE TO RELATED APPLICATION

This application claims the benefit of U.S. provisional application Ser. No. 60/839,954, filed on Aug. 23, 2006, and entitled "A METHOD AND APPARATUS FOR ACQUISITION IN FDMA SYSTEMS." The entirety of this application is incorporated herein by reference.

BACKGROUND

I. Field

The following description relates generally to wireless communication, and particularly to cell acquisition and sequences for acquiring cell information employing synchronization channels and a broadcast channel.

II. Background

Wireless communication systems are widely deployed to provide various types of communication content such as voice, video, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. But regardless the peculiarities of the many available wireless communication systems, in each of these systems a terminal or wireless device upon switching on must perform cell acquisition or cell search in order to become operational. Cell acquisition is the procedure by which a terminal acquires time and frequency synchronization with the network, cell identification, and additional identification of system information critical to operation such as system bandwidth and antenna configuration of cell transmitter.

In a wireless system like third generation long term evolution (3G LTE), or evolution universal terrestrial radio access (E-UTRA), advantageous features for enhanced communication performance such as presence of a cyclic prefix to mitigate inter-symbol interference in orthogonal frequency division multiplexing, and downlink system bandwidth versatility (e.g., a 3G LTE system can be capable of multiple BWs: 1.25 MHz, 1.6 MHz, 2.5 MHz, 5 MHz, 5 MHz, 10 MHz, 15 MHz, and 20 MHz) have led to unique complexities during initial cell acquisition. Besides time synchronization; namely, detection of symbol boundary; 0.5 ms slot boundary; 1 ms sub-frame boundary; 5 ms half radio frame boundary and full 10 ms radio boundary; and 40 ms broadcast channel transmission time interval; and frequency synchronization, which entails acquiring the downlink frequency, so it can be used as a frequency reference for uplink transmission; there are complexities such as determining the bandwidth to be employed for cell acquisition, the physical channels to be employed during cell acquisition, and more importantly the information to be carried by those channels during cell acquisition. While much work has been devoted to addressing each of these issues, the community has so far marginally agreed on a cell acquisition protocol that is fast, reliable, and consumes minimal resources. Therefore, there is a need for cell acquisition protocols with the latter characteristics.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with an aspect, an apparatus that operates in a wireless communication environment, the apparatus comprising a processor configured to receive a code sequence in the primary synchronization channel that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; and a memory coupled to the processor for storing data.

In accordance with an aspect, an apparatus that operates in a wireless communication environment, the apparatus comprising a processor configured to transmit a code sequence in the primary synchronization channel that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; and a memory coupled to the processor for storing data.

In accordance with an aspect, an apparatus that operates in a wireless communication environment with orthogonal frequency division multiple access, the apparatus comprising multiple detection components that acquire simultaneously multiple cell information in multiple subcarrier intervals; a processor configured to process the multiple cell information; and a memory coupled to the processor for storing data.

In accordance with an aspect, an apparatus that operates in a wireless communication environment, the apparatus comprising means for receiving a code sequence of primary synchronization channel symbols that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; and means for receiving one or more code sequences of secondary synchronization channel symbols that convey at least one of a radio frame boundary, a part or a whole cell identification code, and an indication of a broadcast channel bandwidth.

In accordance with an aspect, a machine-readable medium comprising instructions which, when executed by a machine, cause the machine to perform operations including receiving a code sequence of primary synchronization channel symbols that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; receiving one or more code sequences of secondary synchronization channel symbols that convey at least one of a radio frame boundary, a part of or a full cell identification code, and an indication of a broadcast channel bandwidth; and receiving a code sequence of broadcast channel symbols that conveys at least one of a cyclic prefix timing, and the wireless system bandwidth.

In accordance with an aspect, a machine-readable medium comprising instructions which, when executed by a machine, cause the machine to perform operations including transmitting over 1.25 MHz a code sequence of primary synchronization channel symbols that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; and transmitting over 1.25 MHz one or more code sequences of secondary synchronization channel symbols that convey at least one of a radio frame boundary, a part of or a full cell identification code, and an indication of a broadcast channel bandwidth.

In accordance with an aspect, a method used in wireless communications system, the method comprising receiving a code sequence in the primary synchronization channel (P-SCH) that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; receiving one or more code sequences in the secondary synchronization channel (S-SCH) that convey at least one of a radio frame boundary, a part or a whole cell identification code, and an indication of a broadcast channel bandwidth; receiving a code sequence in the broadcast channel (BCH) that conveys at least one of a cyclic prefix timing and the wireless system bandwidth; and processing the P-SCH, S-SCH, and BCH code sequences, and extracting the cell information conveyed by the code sequences.

In accordance with an aspect, a method used in wireless communications system, the method comprising transmitting a code sequence of primary synchronization channel symbols that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection; transmitting one or more code sequences of secondary synchronization channel symbols that convey at least one of a radio frame boundary, a part of or a full cell identification code, and an indication of a broadcast channel bandwidth; and transmitting a code sequence in broadcast channel that conveys at least one of a cyclic prefix timing, and the wireless system bandwidth.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
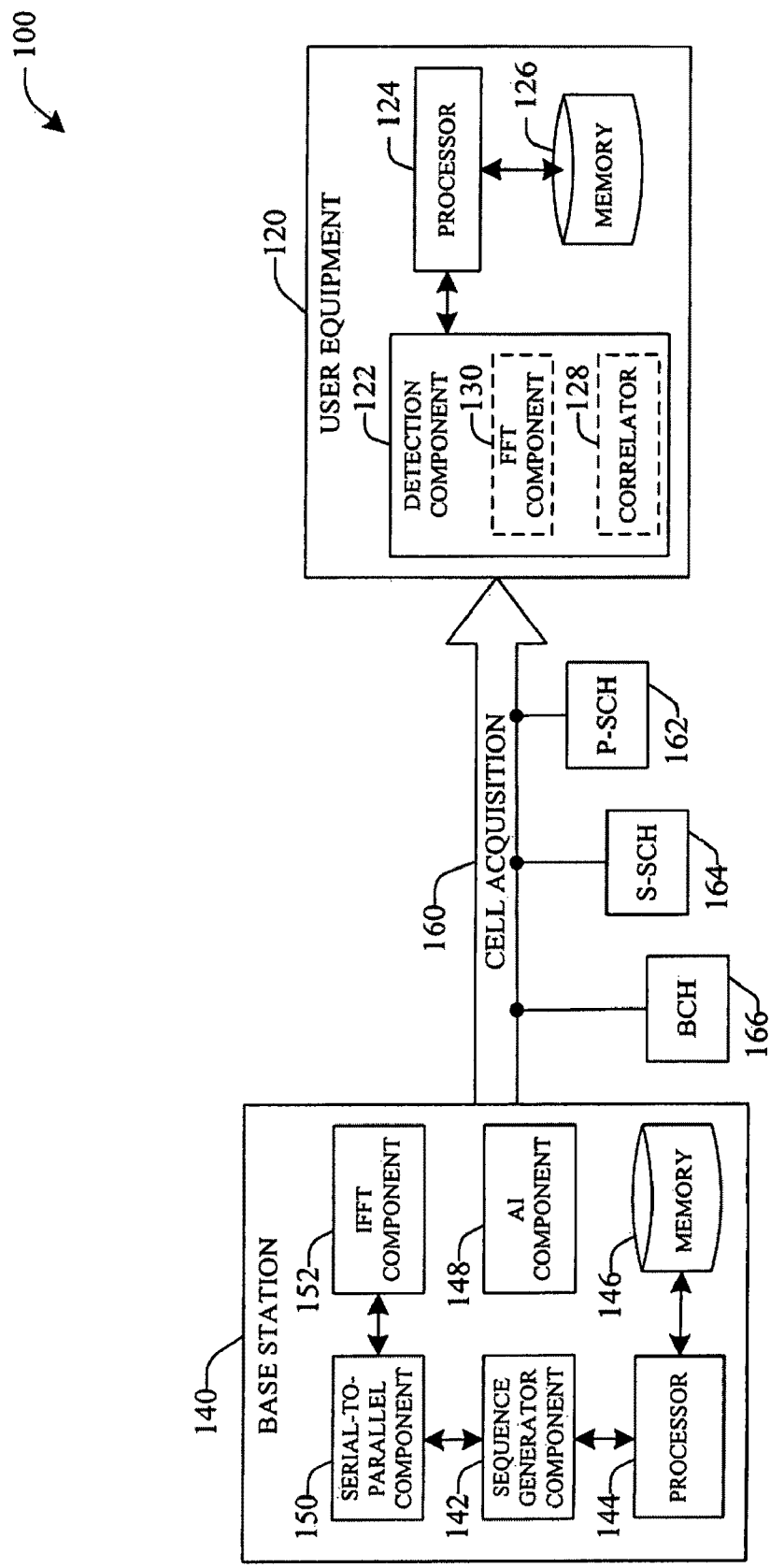
FIG. 1 illustrates a system in which user equipment acquires cell information from a base station.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

As employed herein the word "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an application specific integrated circuit (ASIC). Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment.

In this description, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems and/or methods herein are intended to comprise, without being limited to, these and any other suitable types of memory.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Systems and methods to perform cell acquisition based on code sequences transmitted on primary synchronization channel (P-SCH), secondary synchronization channel (S-SCH), and broadcast channel (BCH) are described hereinafter. Details of the information conveyed by P-SCH, S-SCH, BCH, and the sequences in which the information is conveyed, are presented. Additionally, relay of cell acquisition information, as well as multiple-cell acquisition when wireless system operates with frequency reuse are described.

FIG. 1 shows a-system 100 in which user equipment 120 acquires cell information from base station 140 through code sequences transmitted in primary synchronization channel (P-SCH) 162, secondary synchronization channel (S-SCH) 164, and broadcast channel (BCH) 166 via downlink 160. User equipment 120 can comprise a detection component 122, a processor 124, and a memory 126. Base station 140 can comprise a sequence generator component 142, a processor 144, and a memory 146. Sequence generator component 142 generates code sequences that can contain cell search information such as system bandwidth, antenna configuration at base station 140 (see below), cell identification (ID), etc. Sequences are N-symbol long, the number of bits in a symbol depends on the modulation constellation employed (e.g. BPSK, QPSK, 16-QAM, 64-QAM). Sequences can be pseudorandom codes [e.g., Gold, Walsh-Hadamard, M-sequences (maximum length sequences), and pseudonoise sequence] or a generalized Chirp-like sequence (e.g., Zadoff-Chu). In orthogonal frequency division multiple access (OFDMA), the information stream is mapped into a set of M frequency subcarriers each with frequency span $\Delta v/M$, where $\Delta v$ is the system bandwidth (e.g., 1.25 MHz, 2.5 MHz, 5 MHz, 10 MHz, 15 MHz, 20 MHz). Subcarriers are typically orthogonal tones. A serial-to-parallel (S/P) component 150 parses the N-symbol long sequence into frames of n symbols and maps those n symbols into M subcarriers. (It is noted that S/P component 150 can also reside in sequence generator component 144 rather than being a stand alone component as illustrated in FIG. 1.) A discrete inverse fast Fourier transform (IFFT) component 152 generates a time representation of the symbols in the parallel frames. (It should be appreciated that component 152 can also be an integral part of processor 142.) Upon applying IFFT, a cyclic prefix (CP) is added to the beginning of the time-domain symbols in each transmitted radio sub-frame. CP is introduced as a guard interval to prevent inter-symbol interference (ISI) and inter-carrier interference (ICI). A parallel-to-serial converter (not shown) generates a time-domain symbol stream for each sequence generated by sequence generator component 142, and those streams are transmitted in the downlink 160. Code sequences for P-SCH 162, S-SCH 164, and BCH 166 are generated and transmitted.

Base station 140 can also comprise an artificial intelligence (AI) component 148. The term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, AI component 148 can employ one of numerous methodologies for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described hereinafter.

In user equipment 120, detection component 122, which can comprise a correlator 128 and a fast Fourier transform component, detects P-SCH 162 codes, S-SCH 164 codes, and BCH 166 codes and performs cell acquisition, which enables user equipment 120 to communicate with base station 140. Detection and information conveyed by P-SCH codes, S-SCH codes and BCH codes according to aspects of the present application are presented in greater detail below.

Figure 2:
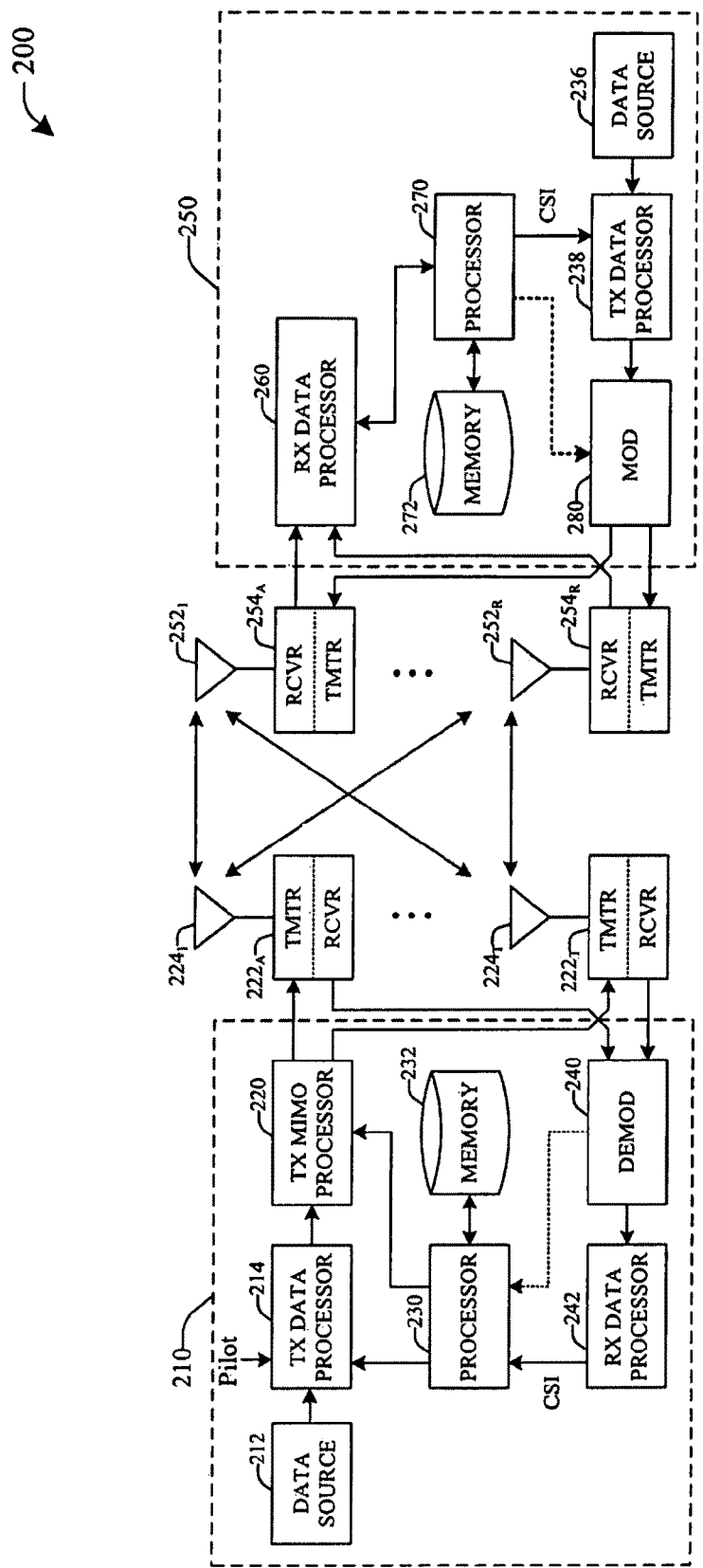
FIG. 2 is a block diagram of MIMO transmitter and a receiver.

FIG. 2 is a block diagram of an embodiment of a transmitter system 210 (such as base station 140) and a receiver system 250 (e.g., user equipment 120) in a multiple-input multiple-output (MIMO) system that can provide for sector communication in a wireless communication environment in accordance with one or more aspects set forth herein. At the transmitter system 210, traffic data for a number of data streams can be provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme [e.g., binary phase-shift keying (BPSK), quadrature phase-shift keying (QPSK), multiple phase-shift keying (M-PSK), or murder quadrature amplitude modulation (M-QAM)] selected for that data stream to provide modulation symbols. The data rate, coding, and modulation for each data stream may be determined by instructions executed by processor 230.

The modulation symbols for all data streams are then provided to a TX MIMO processor 220, which may further process the modulation symbols (e.g., OFDM). TX MIMO processor 220 then provides $N_T$ modulation symbol streams to $N_T$ transmitters (TMTR) 222a through 222t. In certain embodiments, TX MIMO processor 220 applies beamforming weights (or precoding) to the symbols of the data streams and to the antenna from which the symbol is being transmitted. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters $222_A$ through $222_T$ are then transmitted from $N_T$ antennas $224_1$ through $224_T$, respectively. At receiver system 250, the transmitted modulated signals are received by $N_R$ antennas $252_1$ through $252_R$ and the received signal from each antenna 252 is provided to a respective receiver (RCVR) $254_A$ through $254_R$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion. The reverse link message may comprise various types of information regarding the communication link or the received data stream, or a combination thereof. The reverse link message is then processed by a TX data processor 238, which also receives traffic data for a number of data streams from a data source 236, modulated by a modulator 280, conditioned by transmitters $254_A$ through $254_R$, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and processes the extracted message.

Single-user MIMO mode of operation corresponds to the case in which a single receiver system 250 communicates with transmitter system 210, as illustrated in FIG. 2 and according to the operation described above. In such a system, the $N_T$ transmitters $224_1$-$224_T$ (also known as TX antennas) and $N_R$ receivers $252_1$-$252_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to min$\{N_T, N_R\}$. A MIMO channel formed by the $N_T$ transmit and $N_R$ receive antennas may be decomposed into $N_V$ independent channels, which are also referred to as spatial channels, where $N_V \leq$ min $\{N_T, NR\}$. Each of the $N_V$ independent channels corresponds to a dimension.

In one aspect, transmitted/received symbols with OFDM, at tone ω, can be modeled by:

$$y(\omega) = H(\omega)c(\omega) + n(\omega). \qquad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ preceding output vector. $N_V$ is the actual number of data streams (layers) transmitted by transmitter 210, and $N_V$ can be scheduled at the discretion of the transmitter (e.g., base station 140) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 210 allocates to transmit each data stream $N_V$. The net power employed in the transmission is upper-bounded by the regulated value of transmit power for a transmitter in wireless communications.

In system 200 (FIG. 2), when $N_T=N_R=1$, the system reduces to a single-input single-output (SISO) system that can provide for sector communication in a wireless communication environment in accordance with one or more aspects set forth herein.

Figure 3:
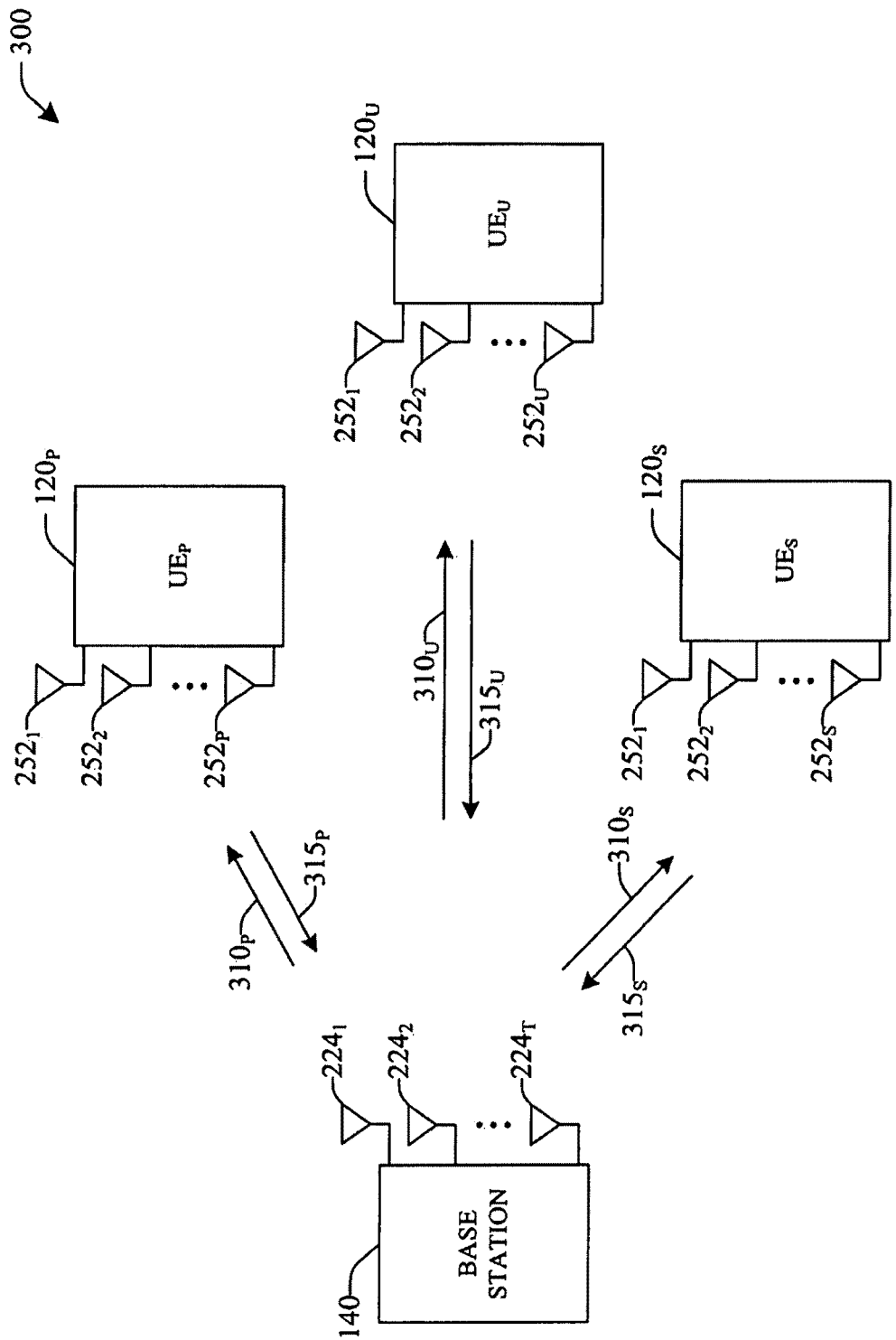
FIG. 3 is a block diagram of a MU-MIMO configuration.

FIG. 3 illustrates an exemplary multiple-user MIMO system 300 in which three UEs $120_P$, $120_U$, and $120_S$ communicate With a base station 140. Base station has $N_T$ TX antennas, and each of the UE has multiple RX antennas; namely, $UE_P$ has $N_P$ antennas $252_1$-$252_P$, $UE_U$ has $N_U$ antennas $252_1$-$252_U$ and $UE_S$ has $N_S$ antennas $252_1$-$252_S$. Communication between terminals and the base station is effected through uplinks $315_P$, $315_U$, and $315_S$. Similarly, downlinks $310_P$, $310_U$, and $310_S$ facilitate communication between base station 140 and terminals $UE_P$, $UE_U$, and $UE_S$, respectively. Additionally, communication between each terminal and base station is implemented in substantially the same manner, through substantially the same components, as illustrated in FIG. 2 and its corresponding description. Because terminals can be located in substantially different locations within the cell serviced by base station 140, each terminal $120_p$, $120u$, and $120s$ has its own matrix channel $h_\alpha$ and response matrix $H_\alpha$ ($\alpha$=P, U, and S), with its own rank. Intra-cell interference can be present due to the plurality of users present in the cell serviced by the base station 140. Although illustrated with three terminals in FIG. 3, it should be appreciated that a MU-MIMO system can comprise any number of terminals, indicated below with index k.

In one aspect, transmitted/received symbols with OFDM, at tone X and for user k, can be modeled by:

$$y_k(\omega)=H_k(\omega)c_k(\omega)+H_k(\omega)\Sigma'c_m(\omega)+n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., base station 140) to the other users in the cell. Inter-cell interference determines at least in part the channel conditions, and thus it is readily apparent that channel state information at the transmitter (CSIT) determined in MU-MIMO operation can be intrinsically different from CSIT in SU-MIMO operation discussed above.

Figure 4:
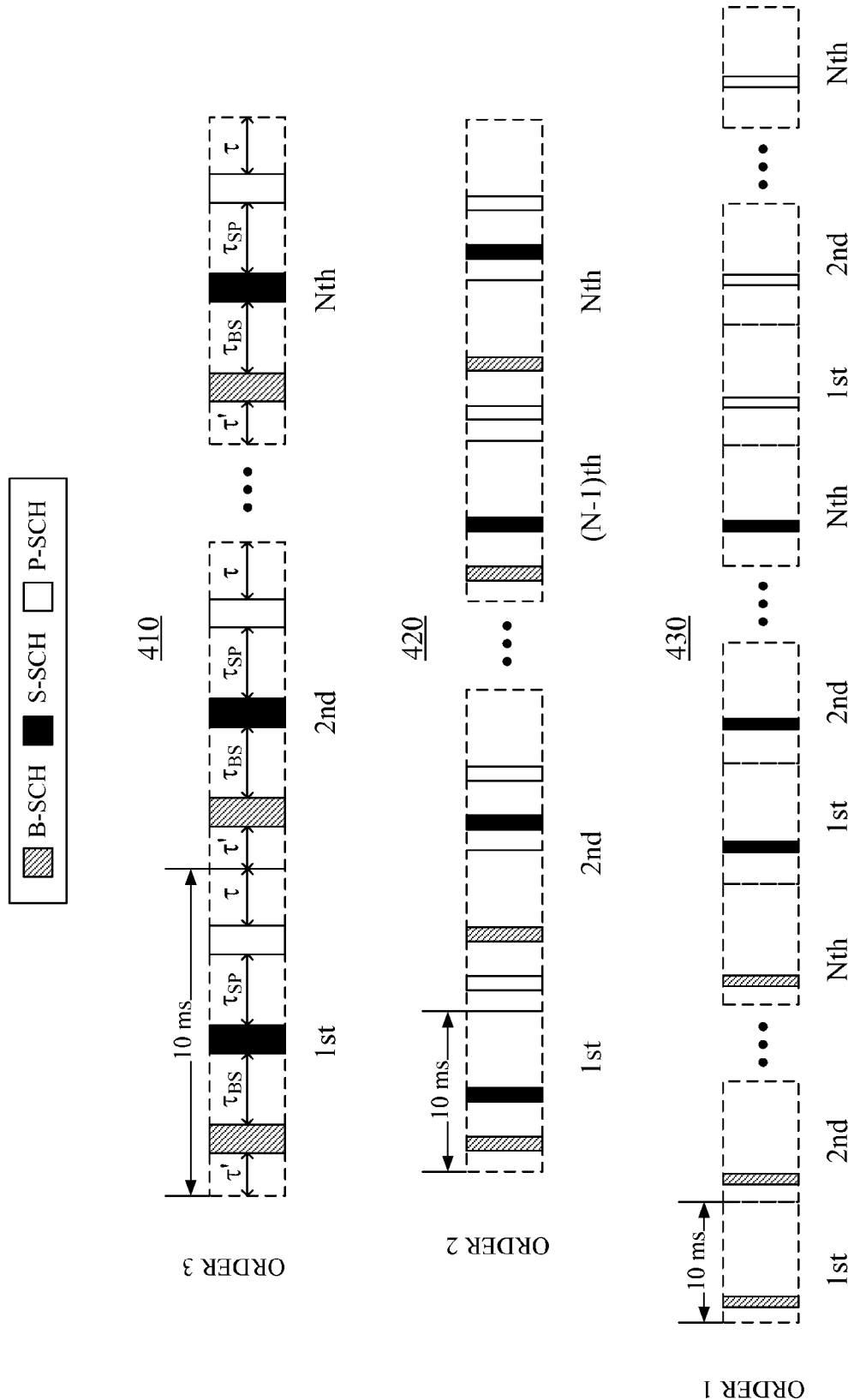
FIG. 4 illustrates transmission configurations of P-SCH codes, S-SCH, and BCH codes.

FIG. 4 illustrates exemplary diagrams 410, 420 and 430 of transmission configurations of P-SCH codes, S-SCH, and BCH codes. As mentioned above, transmission is accomplished in 10 ms radio frames, with sub-frames of 1 ms (not shown), and with slots of 0.5 ms. Symbols are transmitted in such slots. It should be appreciated that in 3G LTE the number of symbols in each sub-frame depends on the length of CP: For long CP (e.g., 16.67 µs), 6 symbols are accommodated per slot, whereas for short CP (e.g., 4.69 µs), 7 symbols are accommodated. Code symbols can occupy one or more of the available symbols in a sub-frame. Moreover, transmitted sequence codes can be N-symbol long for P-SCH, M-symbol long for S-SCH, and L-symbol long for BCH, with N, M, L integers than can be disparate or equal. Diagrams 410, 420, and 430 illustrate example cases of N-symbol streams (N=M=L) with different "orders," where the order is given by the number of symbols sent in each frame. The order of a transmission configuration can affect the efficiency of detection: A high-order transmission can allow quicker detection and therefore quicker cell acquisition than a low-order configuration; however, because a base station (e.g., base station 140) sends acquisition codes such as P-SCH, S-SCH, and BCH codes continually, high-order configuration can be detrimental to data rate after acquisition has been accomplished. It should be appreciated that acquisition codes are sent continually because terminals (e.g., user equipment 120) in a service cell are asynchronously switched on or asynchronously enter the cell from a peripheral cell without proper synchronization.

Diagram 410 illustrates an order-3 transmission configuration, where one symbol of P-SCH code, one symbol of S-SCH, and one symbol of BCH are sent in each frame. A P-SCH code symbol is sent first, delayed a time τ with respect to radio frame boundary; a S-SCH code symbol follows delayed a time $\tau_{SP}$; and a BCH code symbol is sent a $\tau_{BS}$ time afterward. The time between BCH symbol and the radio frame boundary is τ'. It is noted that times τ, $\tau_{SP}$, $\tau_{BS}$, and τ' can be used as design parameters to facilitate detection of frame and sub-frame boundary. In transmission configuration 410, code length is commensurate with radio frame number (e.g., 3×N symbols are conveyed in N radio frames). Diagram 420, shows order-2 configuration, wherein two symbols are conveyed in each frame and symbols cyclically occupy subsequent frames. In such transmission configuration, transmitted symbols are not commensurate with frames. Therefore, information can be sent redundantly in order to convey specific cell information using 3-channel codes, as described hereinafter. Order-1 configuration transmission corresponds to sequential transmission of codes for P-SCH, S-SCH, and BCH. After cell acquisition, which in order-1 transmission can be slower than in higher orders, such transmission can employ bandwidth more efficiently than order-3 configuration. It should be appreciated that in a terminal (e.g., user equipment 1-20) with a single detection component (e.g., detection component 122), cell acquisition can take place hierarchically, e.g., information carried in P-SCH code is acquired first, followed by acquisition of information in S-SCH code, and information carried in BCH. It should be appreciated that transmission configurations other than 410, 420, and 430 are possible, and are within the scope of the present application.

Figure 5A:
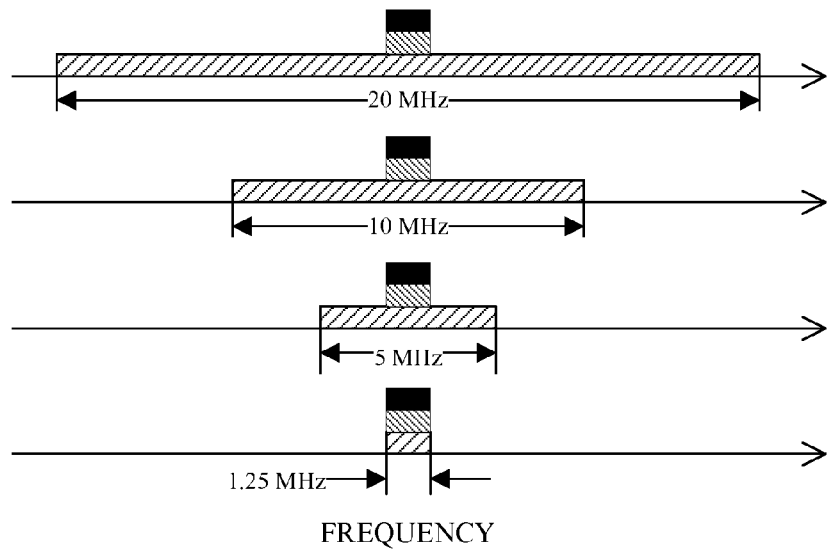
FIGS. 5A and 5B illustrate synchronization and broadcast channel bandwidth utilization.
Figure 5B:
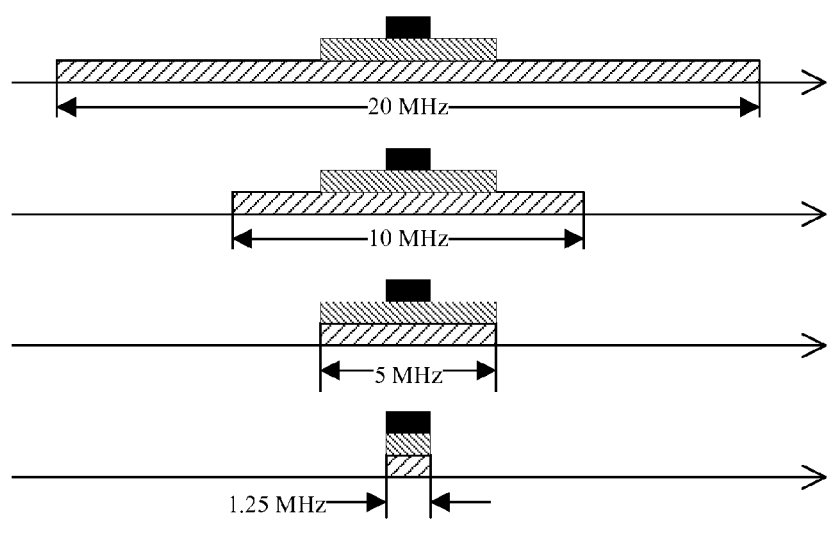

FIGS. 5A and 5B illustrate two schemes 510 and 520 of bandwidth utilization for transmission of P-SCH, S-SCH and BCH code sequences for exemplary system bandwidths (1.25 MHz, 5 MHz, 10 MHz, and 20 MHz) according to an aspect. Acquisition codes (e.g., codes that convey operational cell information to a wireless device such as user equipment 120) can employ a fraction of system bandwidth due to (a) the fact that the system bandwidth is not known until the system is acquired, (b) the specific nature of the conveyed information and (c) the possibility of conveying such information with a short code (small N). Thus, the remainder of the bandwidth can be employed for user and station data transmission (such as user data, channel quality indicator channel, acknowledgment channel, load indicator channel, etc.). In an aspect, synchronization channels (both primary and secondary) and broadcast channel can be transmitted over a 1.25 MHz regardless of system bandwidth (scheme 510). As an example, in 3G LTE, 83 sub-carriers can be accommodated in such frequency interval. In another aspect, synchronization channel can be transmitted over 1.25 MHz regardless of system bandwidth, whereas broadcast channel can be transmitted over 1.25 MHz when system bandwidth is 1.25 MHz and over 5 MHz when BW is wider (scheme 520).

Figure 6:
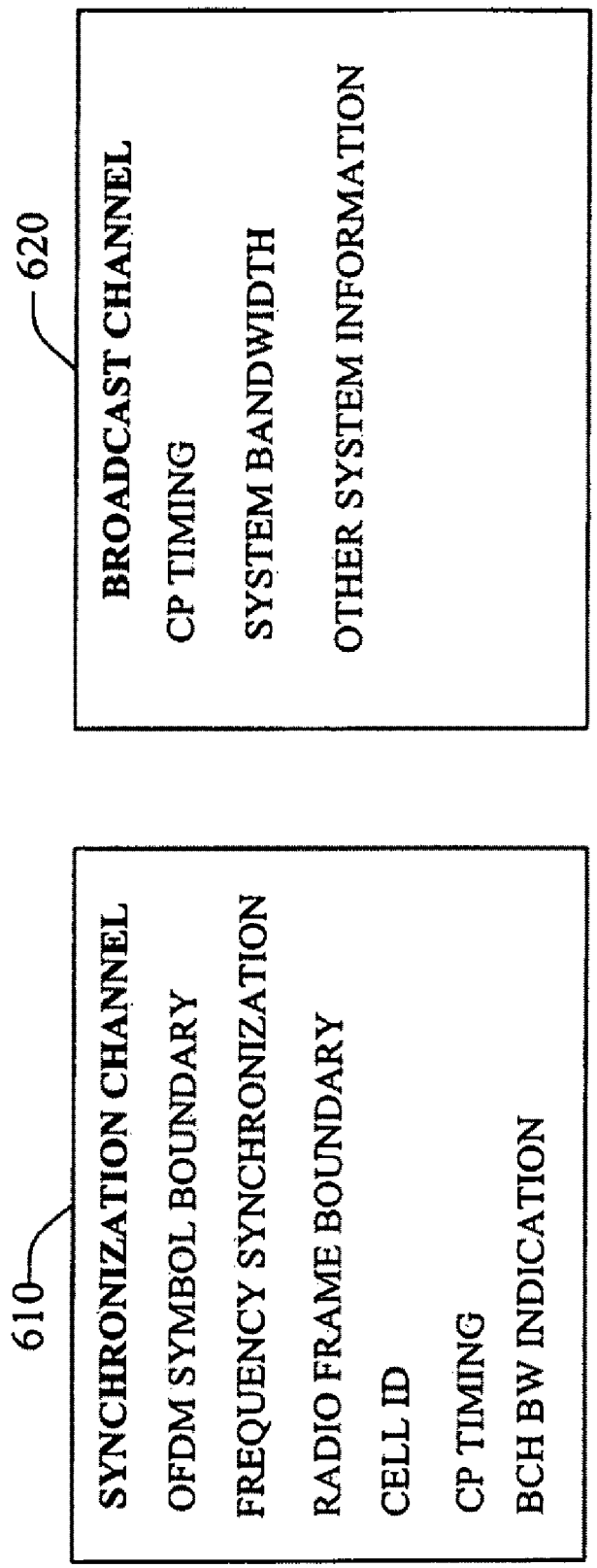
FIG. 6 illustrates information conveyed by synchronization channel and broadcast channel.

FIG. 6 illustrates the information conveyed by the synchronization channel and broadcast channel according to an aspect. As presented in 610, code sequences for SCH can be employed for (1) OFDM symbol boundary detection, (2) coarse frequency synchronization, (3) radio frame boundary detection, (4) cyclic prefix (CP) timing, (5) cell identification, and (6) BCH bandwidth indication. In particular, the primary synchronization channel can be used for coarse frequency synchronization, and for OFDM symbol, slot and sub-frame time boundary. With an appropriate transmission configuration, the secondary synchronization channel can be employed for detection of 5 ms half radio frame and 10 ms radio frame boundary. As presented in 620, code sequences for, BCH can be utilized for (a) CP timing, (b) system bandwidth, and (c) other system information such as base station antenna configuration, peripheral cell information, etc. Timing information, as well as frequency synchronization, can be obtained by correlator 128 in detection component 122, and processor 124. Repeated sequences sent over downlink 160 are detected by correlator 128, and timing metric is computed by processor 124. Timing and frequency synchronization methods such as Moose method, Van De Beenk method, and Schmidl method, propose particular code sequences with repeated sections of the transmitted code in order to estimate frame and subframe boundaries, as well as frequency offset. It should be appreciated that other methods are possible for symbol boundary detection, CP duration, and frequency synchronization. After timing and frequency synchronization, code sequences that carry system information (e.g., cell ID, BCH and system bandwidth, antenna configuration of base station) can be demodulated by FFT component 130, in detection component 122, and cell acquisition can be completed.

Figures 7A, 7B, 7C:
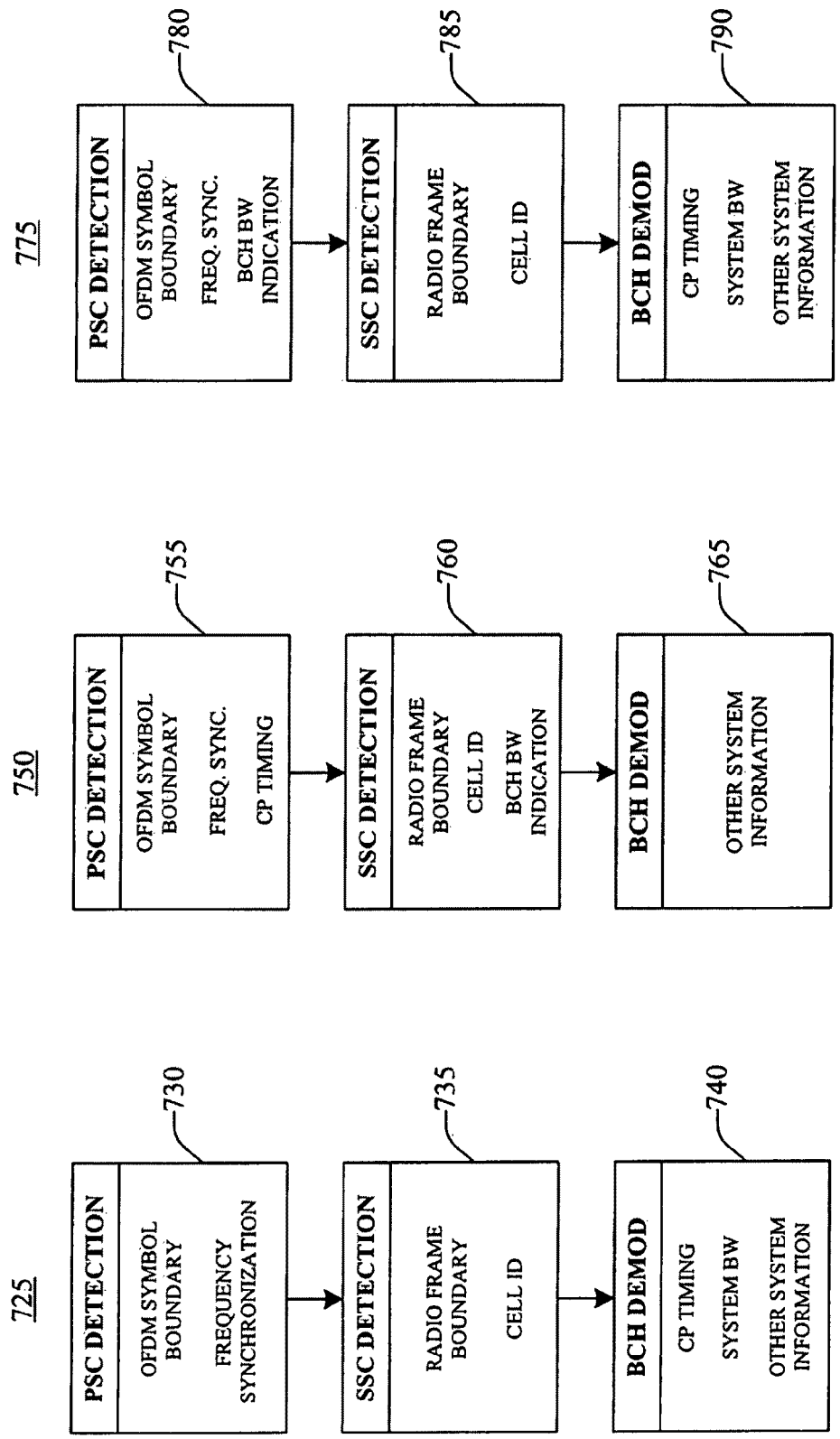
FIGS. 7A, 7B, and 7C illustrate sequences of cell acquisition.

Conveying information listed in panels 610 and 620 can be accomplished through a combination of P-SCH, S-SCH, and BCH code sequences. FIGS. 7A, 7B, and 7C illustrate cell acquisition sequences according to aspects of the present application. In one of such aspects, acquisition sequence 725 (FIG. 7A), at 730, acquires OFDM symbol boundary through (timing or correlation) detection of the primary synchronization code (PSC) sequence; the P-SCH is transmitted over 1.25 MHz (FIG. 5A). It should be appreciated that all cells transmit the same PSC sequence; as mentioned above, the sequence can be, but is not limited to being, a generalized Chirp like sequence (e.g., Zadoff-Chu sequence), a Walsh-Hadamard sequence, a Gold code sequence, an M-sequence, a pseudonoise sequence, etc. Frequency synchronization is performed at 730. In turn, at 735, radio frame boundary and cell ID are detected via the secondary synchronization code (SSC) sequence; S-SCH transmitted over 1.25 MHz (FIG. 5A). In an aspect, in order to convey cell ID information, sequences transmitted in the S-SCH are chosen to indicate all possible 512 hypothesis (number of cell IDs) in 3G LTE. It is noted that each cell ID code can be conveyed with 9 bits. At 740, CP duration, downlink system bandwidth, and other system information are acquired through demodulation of the broadcast channel, which is transmitted over 1.25 MHz (FIG. 5A). It should be appreciated that CP timing can be detected after symbol boundary has been detected. Furthermore, CP timing is necessary in OFDM to successfully demodulate OFDM data symbols, as CP time-guard interval is added at the receiver (e.g., by processor 122) after frequency-domain modulation has been transformed (IFFT) to a time-domain symbol stream, and CP is removed at a pre-FFT state during detection of data.

In another aspect, acquisition sequence 750 acquires, at 755, OFDM symbol boundary and CP timing during decoding of the P-SCH sequence. Two sequences, transmitted over 1.25 MHz (FIG. 5B), can be used to accomplish such acquisition. To reduce inter-symbol interference the sequences can be orthogonal, e.g., Walsh-Hadamard code; however, other sequences can be contemplated and are within the scope of the present invention. As in sequence 725 described above, every cell transmits one of the two PSC sequences. It should be appreciated that upon detection of P-SCH, demodulation of data, other than training or pilot sequences can be accomplished. Frequency synchronization is also performed at 755. At 760, S-SCH sequences transmitted over 1.25 MHz (FIG. 5B) are designed to describe 1024 hypothesis, which can comprise 512 cell ID codes. An indication of BCH bandwidth, which can be either 1.25 MHz or 5 MHz, is obtained. At 765, BCH code sequences are demodulated, such sequences carry other system information as station antenna configuration, neighboring cell IDs, etc. It should be appreciated that the volume of information transmitted in the BCH can scale with channel bandwidth. Furthermore, sequence 750 allows for a variable transmission bandwidth for broadcast channel, thus communication overhead can be maintained substantially the same across all system bandwidths. It should further be appreciated that because of the CP duration detection at P-SCH code detection, a terminal (e.g., user equipment 120) has fewer BCH demodulation hypotheses.

In yet another aspect, acquisition sequence 775 can alternatively combine the information conveyed over by SCH and BCH (FIG. 6). Namely, two P-SCH code sequences transmitted over 1.25 MHz, which can be mutually orthogonal, aid in symbol timing detection and BCH BW indication. Additionally frequency synchronization is performed. S-SCH channel code sequences are transmitted over 1.25 MHz and frequency reuse is applied to such sequences. Frequency reuse contemplates employing different subcarriers sets, out of the full available subcarriers, for transmissions from neighbor or peripheral cells. Thus, sequence frequency (tone) mapping can depend on reuse factor. In an aspect, reuse of 0.1, e.g., effectively no partitioning of the full available set of system subcarriers, for system with $\Delta v \leq 5$ MHz is employed; and reuse of 3, e.g., partitioning of available system subcarriers in three subsets, for systems with $\Delta v \geq 5$ MHz. As an example, in 3G LTE, a wireless transmission system with $\Delta v=20$ MHZ can be divided in two sets of 400 subcarriers and one set of 401 subcarriers. Sequences transmitted in S-SCH are designed to convey 512 hypotheses (cell IDs). It should be appreciated, nonetheless, that cell ID can be conveyed partially over P-SCH and partially over S-SCH, by conveying a fraction of the 9 bits necessary for cell ID in the P-SCH and the remaining bits in the S-SCH. At 790, BCH code sequences are transmitted over 1.25 MHz or 5 MHz depending on system bandwidth (FIG. 5B), and convey CP duration, system BW information, and other system information.

It should be appreciated that after an initial cell acquisition is completed, a terminal (e.g., user equipment 120) can exploit the accomplished frequency synchronization to perform neighbor cell search. In time-synchronous systems, a terminal that has completed cell acquisition possesses time synchronization with neighboring cells, therefore peripheral cell detection is reduced to identifying the cell ID of neighboring cells and other critical information such as antenna configuration at the peripheral cell transmitters. Instead, in the case of an asynchronous system, a terminal needs to repeat full cell search for peripheral cells. It should further be appreciated that codes sequences transmitted by a base station in connection with cell detection can be stored in a memory within the terminal (e.g., memory 126) conducting cell acquisition. Such information can allow terminals to seamlessly conduct cell search under a plurality of acquisition sequences (e.g., acquisition sequences 725, 750, 775).

Figure 8A:
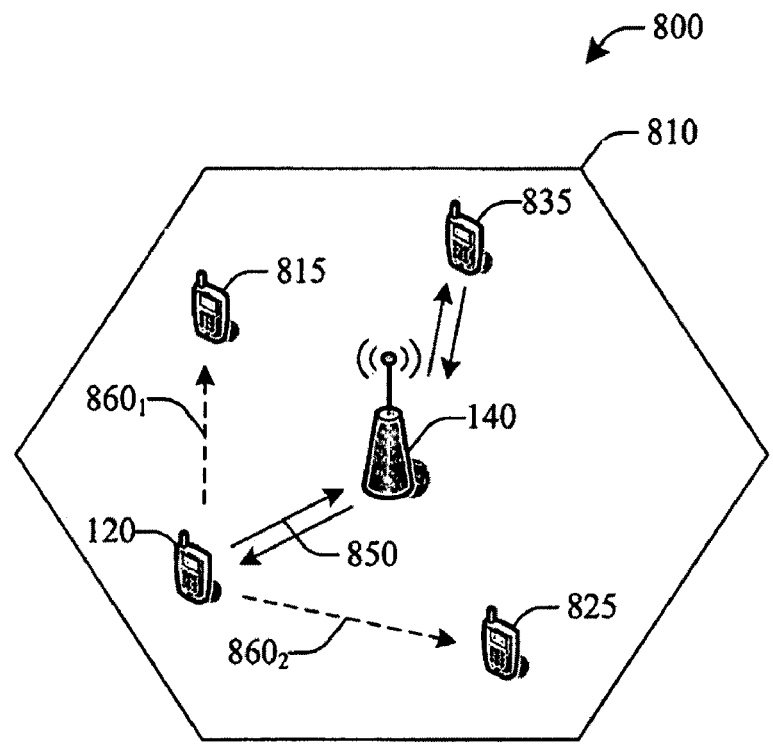
FIGS. 8A and 8B illustrate relaying of cell information.

Successful search acquisition by a terminal depends on channel conditions (e.g., SNR, SINR). Terminals with poor channel quality indicators can fail cell acquisition, failing to establish functional wireless communication links with an access point (e.g., base station 140). To increase the likelihood a terminal can succeed at cell acquisition (synchronization), cell search information can be relayed from a synchronized terminal to those terminals with a poor channel state. FIG. 8A illustrates a system 800 in which a terminal 120 that has completed cell acquisition (synchronization), from a base station 140 in a service cell 810, relays cell information to two unsynchronized terminals 815 and 825 that can experience poor channel conditions. Exemplary service cell 810 is hexagonal, but it should be appreciated that cell shape is dictated by the particular tiling that covers a specific area of service. During cell acquisition, terminal 120 stores the P-SCH, S-SCH and BCH code sequences in a memory (e.g., memory 126). As described above, such sequences convey operational cell information that allows a wireless device (e.g., terminal 12Q) to establish active communication links 850 with a base station (e.g., base station 140). Cell acquisition sequences (e.g., sequences 725, 750, and 775) are relayed to terminal 815, via link $860_1$, and terminal 825, via link $860_2$, for synchronization purposes. Those terminals can then become synchronized regardless the channel conditions with an access point (e.g., base station 140). It is noted that in system 800, terminal 120 transmits synchronization code sequences continually in a substantially similar manner as a base station does. Additionally, when relaying synchronization code sequences of P-SCH, S-SCH, and BCH, employed bandwidth need not be the same bandwidth employed by base station (e.g., 1.25 MHz or 5 MHz).

Relaying synchronization information can increase complexity of terminal (e.g., terminal 120) architecture, in addition to increasing communication overhead. To mitigate the latter, a terminal can relay information at specific scheduled times, e.g., $\{\tau_P, \tau_Q, \tau_R\}$, during specific time intervals, e.g., $\{\Delta\tau_P, \Delta\tau_Q, \Delta\tau_R\}$, as shown in diagram 850, FIG. 6B. It should be appreciated that such times and time intervals are only exemplary, and relaying can take place at many other distinct times and intervals. Such times can be stored in a terminal's memory (e.g., memory 126), or can be terminal specific—the time interval assuming different values for different terminals depending on terminal architecture such as power resources, antenna configuration, etc. A terminal's processor (e.g., processor 124) can schedule the times at which the relaying of cell information is triggered, and the processor can also trigger the relaying of information. In the case wherein relaying time interval can be time specific, relaying cell information can become asynchronous, and terminal diversity (e.g., presence of several synchronized terminals in service cell) can ensure that terminals with low SNR (e.g., geography- or climate-related poor reception) still can synchronize and receive data while poor communication conditions with a base station persist. It is noted that power dissipation of electromagnetic radiation can decay inversely proportional to the square of distance from the radiation source. Therefore, SNR can be poor between a terminal and base station, yet SNR can be significantly higher between a terminal and a relaying terminal (e.g., terminal 120, terminal 835) as the terminals can be geographically closer.

Alternatively, or in addition, to relaying cell information at predetermined times, a synchronized terminal (e.g., terminal 120) can receive a pilot sequence from base station indicating to trigger a relay period (e.g., $\Delta\tau_P$, $\Delta\tau_Q$, $\Delta\tau_R$). An artificial intelligence component in base station can infer through statistical-based analysis and/or utility analysis, when to send pilot signals requesting relaying cell information, based on instantaneous or temporally and/or spatially averaged channel quality indicators of synchronized terminals in the service cell. It is noted that subsequently to sending a "request to relay" pilot signal, base station can temporarily stop sending cell information in the downlink to reduce overhead.

Figure 8B:
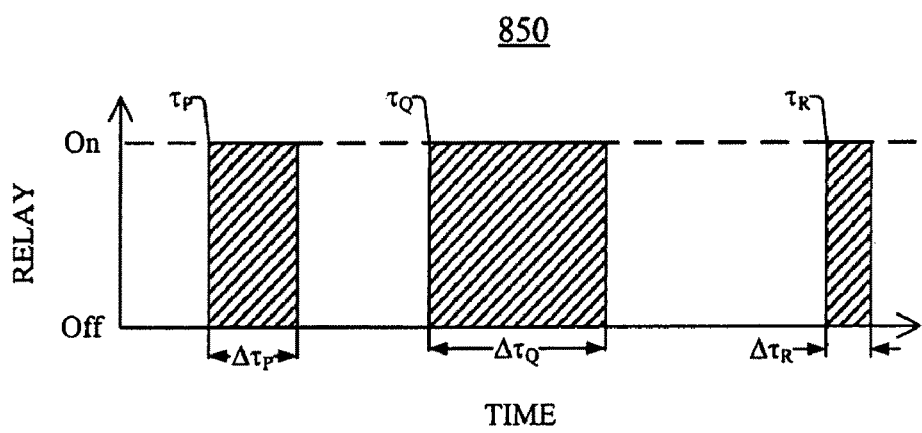

It should be appreciated that a second synchronized relaying terminal (e.g., terminal 835) can assume the active role of relaying data after a first relaying terminal (e.g., terminal 120) relays information for a predetermined period of time; subsequently, other terminals can continue to relay data. Each of the relaying terminals can have a time-dependent relaying profile as displayed by diagram 850 in FIG. 8B. In an aspect, cell-search relaying can be employed in environments where voice, video, or data wireless transfer, or any combination thereof, are mission critical. In an aspect, such environment can be an urban battle field, where substantially undisrupted wireless access to enemy intelligence is mission critical, and where SNR is typically low inside buildings and facilities. A base station can be embodied in an armored vehicle with a transceiver for wireless communication offering logistic support to a small group of troops carrying mobile terminals. As troops carry out their mission, each of the mobile terminals with adequate levels of SNR can relay synchronization information as the troops enter and exit buildings and facilities, thus entering and leaving critically-low SNR regions, with the ensuing need for cell acquisition.

Figure 9A:
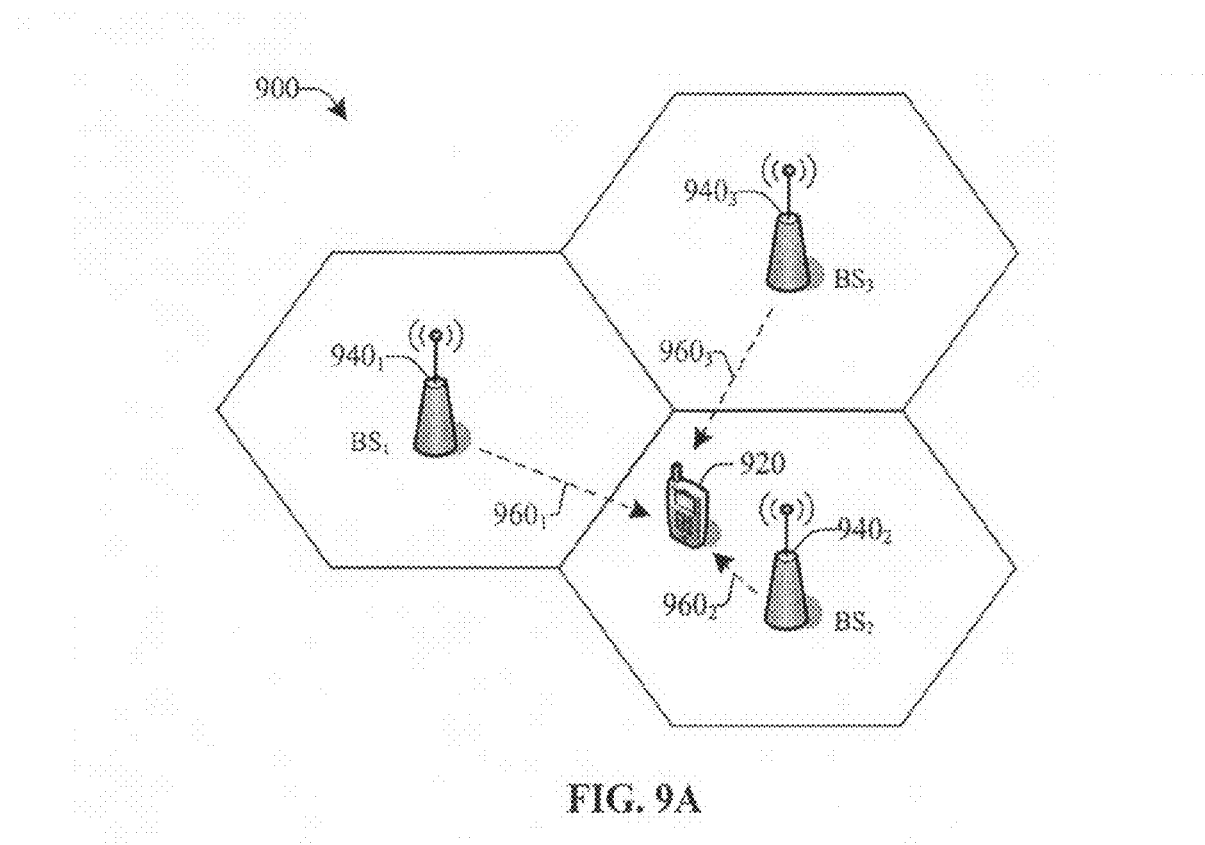
FIG. 9 illustrates a system which a terminal simultaneously acquires cells that operate with frequency reuse.
Figure 9B:
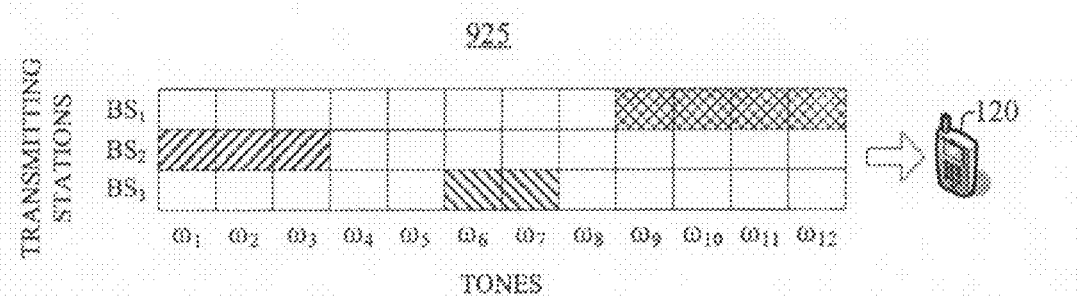
Figure 9C:
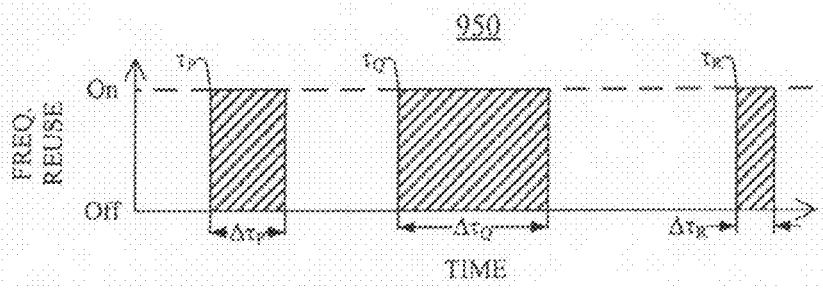

FIG. 9A illustrates system 900 in which terminal 920 acquires neighboring cells $940_1$, $940_2$, and $940_3$ simultaneously, via downlinks $960_1$-$960_3$, when such cells operate with frequency reuse. In multi-cell synchronization based on frequency reuse, to avoid performance degradation (e.g., throughput reduction) due to employment of a subset of subcarriers instead of all subcarriers available to each base station (see exemplary diagram 925 showing 12 tones; FIG. 9B), multi-cell operation with frequency reuse can be active at specific times, e.g. $\{\tau_0, \tau_1, \ldots, \tau_K\}$ during a predetermined operation cycle (e.g., an hour, a day) for specific period of times, e.g., $\{\Delta\tau_0, \Delta\tau_1, \ldots, \Delta\tau_K\}$. At times outside intervals $[\tau_\alpha, \tau_\alpha+\Delta\tau_\alpha]$ ($\alpha$=0, 1, ..., K), operation employing all subcarriers is resumed. Such time-dependent operation is illustrated in exemplary diagram 950, FIG. 9C. In an aspect, switching to frequency reuse operation is determined by processors that can be present in each of the base stations (e.g., $BS_1$, $BS_2$, and $BS_3$) operating in frequency reuse. Specific times $\{\tau_0, \tau_1, \ldots, \tau_K\}$ and time intervals $\{\Delta\tau_0, \Delta\tau_1, \ldots, \Delta\tau_K\}$ can be stored in memories residing in each of the base stations that operate with frequency reuse.

Figure 10:
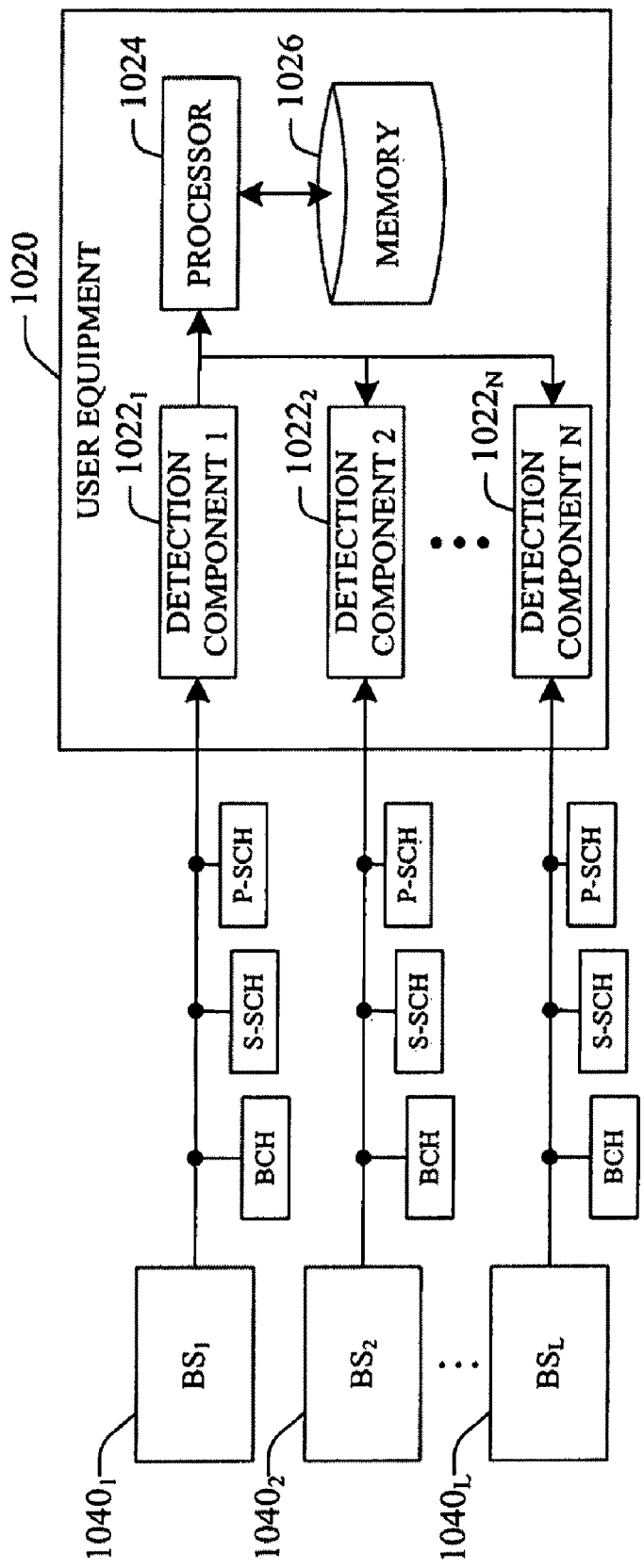
FIG. 10 is a block diagram of the architecture of a system in which a terminal simultaneously acquires multiple cells operating with frequency reuse.

FIG. 10 illustrates the architecture of a system 1000 in which user equipment 1020 simultaneously acquires multiple cells, with cell emitters $1040_1$-$1040_L$, during frequency reuse operation. Upon selection of a subcarrier set, a base station (e.g., base station $1040_K$, with 1<K<L) maps synchronization channel (P-SCH and S-SCH) and broadcast channel cell-acquisition code sequences onto the selected set of sub-carriers, and transmits those codes at the center of the selected subcarrier subset. Terminal $1040_K$ can employ a terminal-specific bandwidth for the selected subcarriers. In an aspect, such a bandwidth is the minimum between 1.25 MHz and the frequency span of the selected subcarriers. User equipment 1020 possesses an architecture that enables it to detect simultaneously a set of L data streams. Such L streams correspond to the OFDM symbols sent onto the L subsets of subcarriers consistent with frequency reuse of order L that base stations $1040_1$-$1040_L$ employ for communication. Therefore, user terminal 1020 can simultaneously acquire L cells. Architecture of terminal 1020 can comprise a processor 1022, a memory 1024, and detection components $1026_1$-$1026_L$. Each of these detection components operate in substantially the same manner as detection component 122 (see above; FIG. 1). In another aspect, multi-cell acquisition with frequency reuse can be employed at specific sectors where large number of terminals can synchronize nearly-simultaneously (e.g., during taxing in an airplane after landing, upon exciting a building with all-terminals-off policies such as courthouses, some hospital areas, etc.

Figure 11:
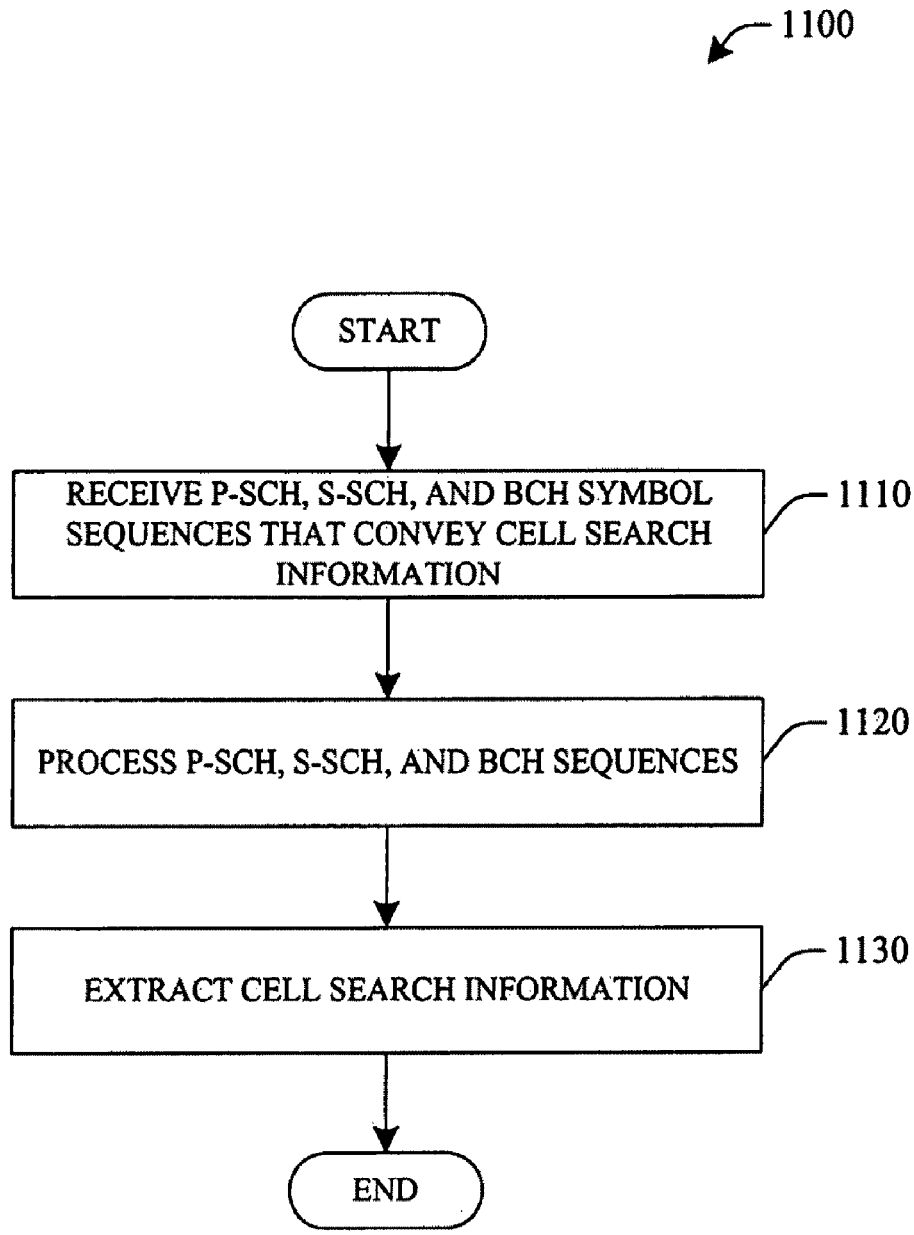
FIG. 11 is a flowchart of a methodology to perform cell acquisition.
Figure 12:
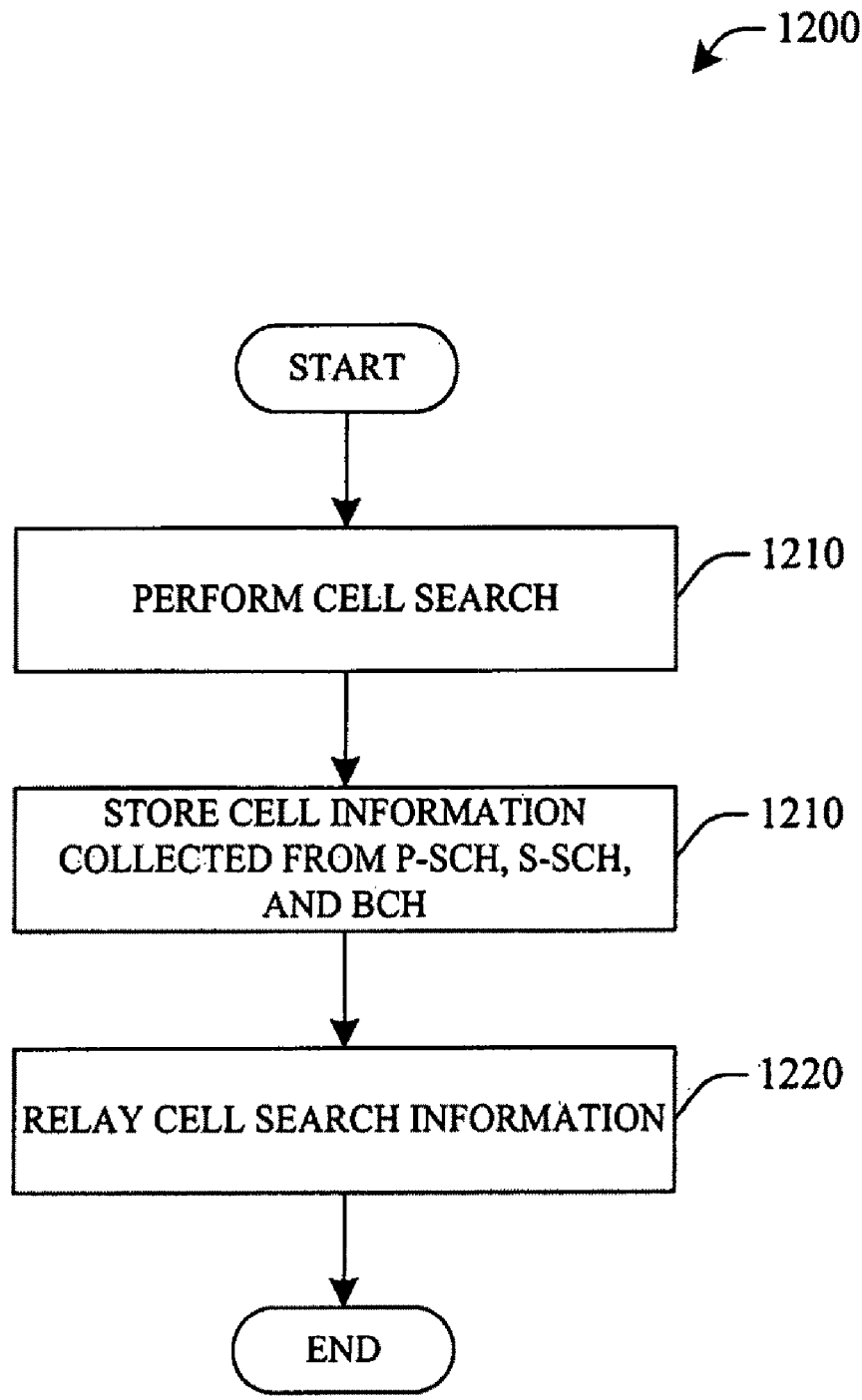
FIG. 12 is a flowchart of a methodology to relay cell synchronization information.
Figure 13:
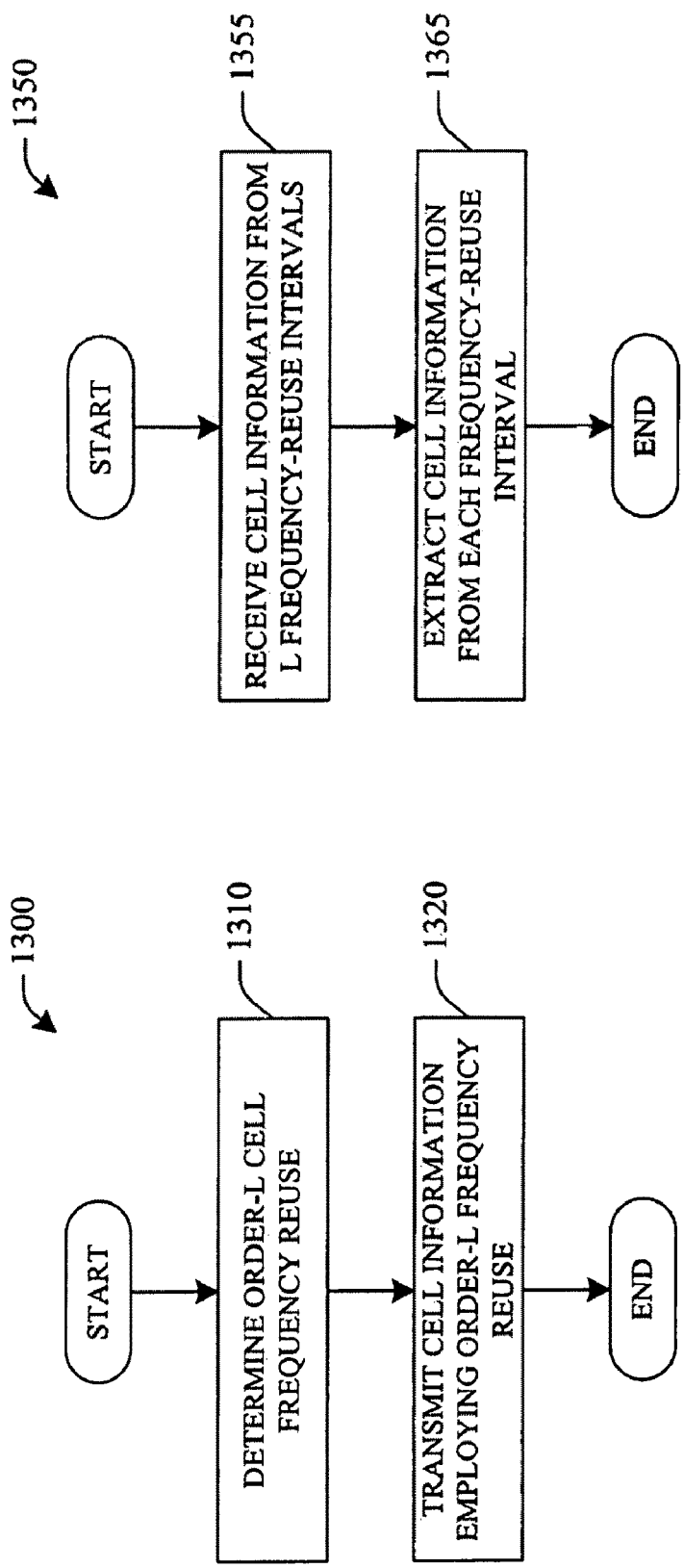
FIGS. 13A and 13B is a flowchart of a methodology to transmit and receive, respectively, cell information employing frequency reuse.

In view of the exemplary systems shown and described above, methodologies that may be implemented in accordance with the disclosed subject matter, will be better appreciated with reference to the flow charts of FIGS. 11-13. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 11 displays a flowchart of a methodology to perform cell acquisition. At act, receive P-SCH, S-SCH, and BCH code sequences carrying cell information. Such information can comprise OFDM symbol boundary, frequency synchronization, radio frame boundary, cell identification, cyclic prefix timing, BCH bandwidth indication, system bandwidth, and other system information such as base station antenna configuration, peripheral cell information, etc. At act 1120, code sequences are processed, e.g., correlation timing metrics are computed. In an aspect, such computation can be performed by a processor residing in the user equipment such as processor 124. At act 1130, the cell information mentioned above is extracted.

FIG. 12 displays a flowchart of a methodology to relay cell synchronization information. At act 1210, a cell search is performed according to one or more aspects described herein (e.g., FIG. 7A, 7B, or 7C). At act 1220, code sequences for primary and secondary synchronization channels and broadcast channel are stored. In an aspect, storage can be embodied in a memory residing in the terminal that has performed the cell search at act 1210. Such memory can be memory 126. The relay of cell information through transmission of the stored code sequences is accomplished at act 1230. In an aspect, the bandwidth employed for transmission of such code sequences is determined by the capabilities of user equipment performing the information relay, and such bandwidth can be different from the bandwidth employed by base station to convey the code sequence to relaying user equipment.

FIG. 13A/13B is a flowchart of a methodology to transmit/receive cell information employing frequency reuse in a cellular wireless communication system. Referring initially to FIG. 13A, at act 1310 frequency reuse of order L is determined. In an aspect, in OFDMA such frequency reuse can result in a selection of L subsets of subcarriers out of the whole set of available subcarriers compatible with the system bandwidth, and subsequent adjudication of such L subsets to L cell transmitters (e.g., base stations $1040_1$-$1040_L$; see also FIG. 9). Such determination is normally the result of an operator adhering to a standard of wireless communication (e.g., 801.11b, 801.11g, 3G LTE). At act 1320, cell information is transmitted using the determined L subcarrier subsets. Referring next to FIG. 13B, at act 1355 cell information is received from L subsets of subcarriers. In an aspect, information is detected by user equipment with adequate architecture (e.g., user equipment 1020) to detect P-SCH, S-SCH and demodulate BCH simultaneously for all L code sequence transmissions. At act 1365, cell information is extracted from each of the L subsets of subcarriers.

Figure 14:
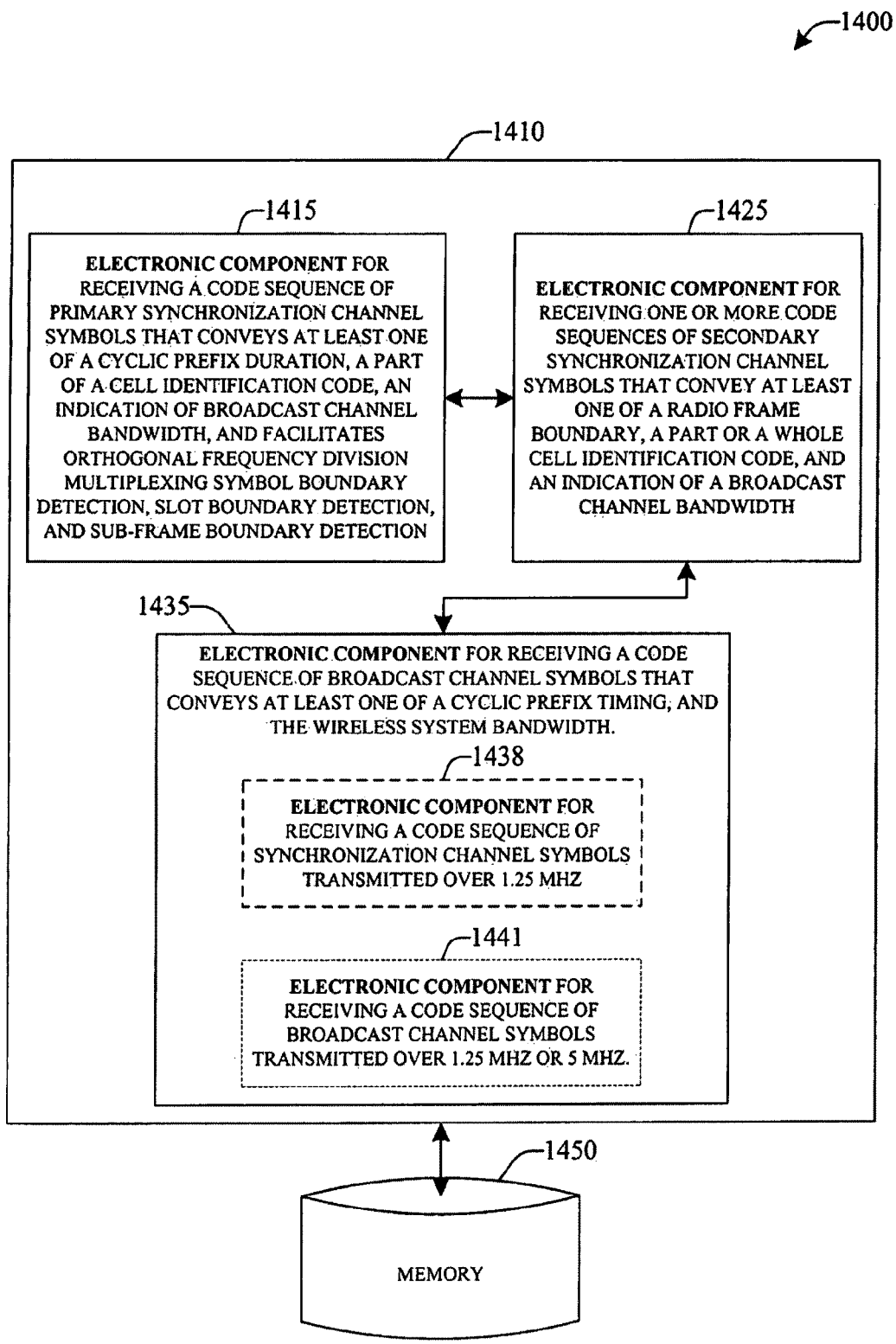

Referring now to FIG. 14, a system 1400 that enables receiving code-sequences of primary and secondary synchronization channel symbols is illustrated. System 1400 can reside, at least partially, in a wireless device (e.g. user equipment 120) and include functional blocks, which can be functional blocks that represent functions implemented by a processor or an electronic machine, software, or combination thereof (e.g., firmware). In particular, system 1400 includes a logical grouping 1410 of electronic components that can act in conjunction. In an aspect, logical grouping 1410 includes an electronic component 1415 for receiving a code sequence of primary synchronization channel symbols (see, e.g., FIG. 4) that conveys at least one of a cyclic prefix duration, a part of a cell identification code, an indication of broadcast channel bandwidth, and facilitates orthogonal frequency division multiplexing symbol boundary detection, slot boundary detection, and sub-frame boundary detection. In addition, logical grouping 1410 includes an electronic component 1425 for receiving one or more code sequences of secondary synchronization channel symbols (see, e.g., FIG. 4) that convey at least one of a radio frame boundary, a part or a whole cell identification code, and an indication of a broadcast channel bandwidth. Furthermore, logical grouping 1410 comprises and electronic component 1435 for receiving a code sequence of broadcast channel symbols (see, e.g., FIG. 4) that conveys at least one of a cyclic prefix timing, and the wireless system bandwidth. It is noted that electronic component 1435 further includes electronic component 1438 for receiving a code sequence of synchronization channel symbols transmitted over 1.25 MHz (see, e.g., FIG. 5A), and electronic component 1441 for receiving a code sequence of broadcast channel symbols transmitted over 1.25 MHz or 5 MHz (see, e.g., FIG. 5B).

Additionally, system 1400 can include a memory 1450 that retains instructions for executing functions associated with electrical components 1415, 1425, 1335, and 1438 and 1441, as well as data that may be generating during executing such functions. While shown as being external to memory 1450, it is to be understood that one or more of electronic components 1415, 1425, 1335, and 1438 and 1441 can exist within memory 1450.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for wireless communication, the apparatus comprising:
a processor configured to receive a code sequence in a primary synchronization channel that conveys a part of a cell identification code, at least one code sequence in a secondary synchronization channel that convey the remaining part of the cell identification code, and a code sequence in a broadcast channel that conveys wireless system bandwidth, the broadcast channel differing from the primary synchronization channel and the secondary synchronization channel;
and a memory.

2. The apparatus of claim 1, the processor further configured to relay the code sequence to a terminal in the wireless communication system.

3. The apparatus of claim 2, the processor further configured to schedule a time to trigger the relaying of the code sequence.

4. The apparatus of claim 1, wherein the code sequence in the primary synchronization channel comprises a Zadoff-Chu sequence.

5. An apparatus for wireless communication, the apparatus comprising:
a processor configured to transmit a code sequence in the a primary synchronization channel that conveys a part of a cell identification code, to transmit at least one code sequence in a secondary synchronization channel that convey the remaining part of the cell identification code, and a code sequence in a broadcast channel that conveys wireless system bandwidth, the broadcast channel differing from the primary synchronization channel and the secondary synchronization channel; and
a memory.

6. The apparatus of claim 5, the processor further configured to transmit all of the code sequences over 1.25 MHz.

7. The apparatus of claim 5, the processor further configured to transmit the broadcast channel code sequence over 1.25 MHz when the system bandwidth (BW) is smaller than 5 MHz, and over 5 MHz when BW is greater than or equal to 5 MHz.

8. The apparatus of claim 5, the processor further configured to transmit a request to relay the code sequence in the primary synchronization channel.

9. The apparatus of claim 8, the processor further configured to temporarily stop transmitting the code sequence in the in the primary synchronization channel to reduce overhead.

10. The apparatus of claim 5, the processor further configured to transmit a request to relay the at least one code sequence in the secondary synchronization channel.

11. The apparatus of claim 10, the processor further configured to temporarily stop transmitting the at least one code sequence in the in the secondary synchronization channel to reduce overhead.

12. The apparatus of claim 5, the processor further configured to transmit a request to relay the broadcast channel code sequence.

13. The apparatus of claim 12, the processor further configured to temporarily stop transmitting the broadcast channel code sequence to reduce overhead.

14. The apparatus of claim 5, further comprising:
an artificial intelligence component that infers when to send a request to relay the code sequence in the primary synchronization channel to a synchronized terminal based at least in part on instantaneous or temporally or spatially averaged channel quality indicators of synchronized terminals.

15. The apparatus of claim 5, further comprising:
an artificial intelligence component that infers when to send a request to relay the at least one code sequence in the secondary synchronization channel to a synchronized terminal based at least in part on instantaneous or temporally or spatially averaged channel quality indicators of synchronized terminals.

16. The apparatus of claim 5, further comprising:
an artificial intelligence component that infers when to send a request to relay the broadcast channel code sequence to a synchronized terminal based at least in part on instantaneous or temporally or spatially averaged channel quality indicators of synchronized terminals.

17. The apparatus of claim 5, the processor further configured to operate with frequency reuse during a scheduled time interval.

18. The apparatus of claim 5, wherein the code sequence in the primary synchronization channel comprises a Zadoff-Chu sequence.

19. A non-transitory machine-readable medium comprising instructions which, when executed by a machine, cause the machine to perform operations including:
receiving a code sequence of primary synchronization channel symbols that conveys a part of a cell identification code;
receiving at least one code sequence of secondary synchronization channel symbols that convey the remaining part of the cell identification code; and
receiving a code sequence in a broadcast channel that conveys wireless system bandwidth, the broadcast channel differing from the primary synchronization channel and the secondary synchronization channel.

20. A non-transitory machine-readable medium comprising instructions which, when executed by a machine, cause the machine to perform operations comprising:
transmitting over 1.25 MHz a code sequence of primary synchronization channel symbols that conveys;
transmitting over 1.25 MHz one or more code sequences of secondary synchronization channel symbols that convey part of the cell identification code; and
transmitting a code sequence in a broadcast channel (BCH) that conveys wireless system bandwidth, the broadcast channel differing from the primary synchronization channel and the secondary synchronization channel.

21. A method for wireless communications, the method comprising:
receiving a code sequence in a primary synchronization channel (P-SCH) that conveys a part of a cell identification code;
receiving at least one code sequence in a secondary synchronization channel (SSCH) that convey the remaining part of the cell identification code;
receiving a code sequence in a broadcast channel (BCH) that conveys wireless system bandwidth, the broadcast channel differing from the primary synchronization channel and the secondary synchronization channel; and
processing the P-SCH, S-SCH, and BCH code sequences, and
extracting cell information conveyed by the P-SCH, S-SCH, and BCH code sequences.

22. The method of claim 21, further comprising:
receiving the code sequence in the primary synchronization channel, the secondary synchronization channel and the broadcast channel over 1.25 MHz.

23. The method of claim 21, further comprising:
storing the cell information extracted from the primary and secondary synchronization channels, and the broadcast channel; and
relaying the cell information.

24. The method of claim 21, further comprising scheduling a time to relay the cell information.

25. The method of claim 21, wherein the code sequence in the primary synchronization channel comprises a Zadoff-Chu sequence.

26. A method for wireless communications comprising:
transmitting a code sequence of primary synchronization channel symbols that conveys a part of a cell identification code;
transmitting at least one code sequence of secondary synchronization channel symbols that convey the remaining part the cell identification code; and
transmitting a code sequence of symbols in a broadcast channel that conveys wireless system bandwidth, the broadcast channel differing from the primary synchronization channel and the secondary synchronization channel.

27. The method of claim 26, further comprising transmitting the code sequence of symbols for the primary and secondary synchronization channels, and the code sequence of symbols for the broadcast channel, employing frequency reuse.

28. The method of claim 26, the code sequences being a Walsh-Hadamard sequence.

29. The method of claim 26, the code sequences being a Gold sequence.

30. The method of claim 26, the code sequences being a pseudonoise sequence.

31. The method of claim 26, the code sequences being a maximum length sequence (M-sequences).

32. The method of claim 26, the code sequences being a generalized Chirp like sequence.

33. The method of claim 26, the code sequences being any combination of a Walsh-Hadamard sequence, a Gold sequence, a pseudonoise sequence, a maximum length sequence, and a generalized Chirp like sequence.

34. The method of claim 26, wherein the code sequence in the primary synchronization channel comprises a Zadoff-Chu sequence.

35. An apparatus for wireless communications, comprising:
means for receiving a code sequence in a primary synchronization channel (PSCH) that conveys a part of a cell identification code;
means for receiving at least one code sequence in a secondary synchronization channel (S-SCH) that convey the remaining part of the cell identification code;
means for receiving a code sequence in a broadcast channel (BCH) that conveys wireless system bandwidth, the broadcast channel differing from the primary synchronization channel and the secondary synchronization channel; and
means for processing the P-SCH, S-SCH, and BCH code sequences, and
means for extracting cell information conveyed by the P-SCH, S-SCH, and BCH code sequences.

36. The apparatus of claim 35, further comprising:
means for receiving the code sequence in the primary synchronization channel, the secondary synchronization channel and the broadcast channel over 1.25 MHz.

37. The apparatus of claim 35, further comprising:
means for storing the cell information extracted from the primary and secondary synchronization channels, and the broadcast channel; and
means for relaying the cell information.

38. The apparatus of claim 35, further comprising means for scheduling a time to relay the cell information.

39. The apparatus of claim 35, wherein the code sequence in the primary synchronization channel comprises a Zadoff-Chu sequence.

40. An apparatus for wireless communications comprising:
means for transmitting a code sequence of primary synchronization channel symbols that conveys a part of a cell identification code;
means for transmitting at least one code sequence of secondary synchronization channel symbols that convey the remaining part the cell identification code; and
means for transmitting a code sequence of symbols in a broadcast channel that conveys wireless system bandwidth, the broadcast channel differing from the primary synchronization channel and the secondary synchronization channel.

41. The apparatus of claim 40, further comprising means for transmitting the code sequence of symbols for the primary and secondary synchronization channels, and the code sequence of symbols for the broadcast channel, employing frequency reuse.

42. The apparatus of claim 40, the code sequences being a Walsh-Hadamard sequence.

43. The apparatus of claim 40, the code sequences being a Gold sequence.

44. The apparatus of claim 40, the code sequences being a pseudonoise sequence.

45. The apparatus of claim 40, the code sequences being a maximum length sequence (M-sequences).

46. The apparatus of claim 40, the code sequences being a generalized Chirp like sequence.

47. The apparatus of claim 40, the code sequences being any combination of a Walsh-Hadamard sequence, a Gold sequence, a pseudonoise sequence, a maximum length sequence, and a generalized Chirp like sequence.

48. The apparatus of claim 40, wherein the code sequence in the primary synchronization channel comprises a Zadoff-Chu sequence.

* * * * *